United States Patent
Barnes, Jr. et al.

(10) Patent No.: US 8,075,747 B2
(45) Date of Patent: Dec. 13, 2011

(54) ENHANCEMENT OF ALUMINUM TAPPING BY APPLICATION OF TARGETED ELECTROMAGNETIC FIELD

(75) Inventors: Edward R. Barnes, Jr., Goose Creek, SC (US); Donald P. Ziegler, Québec (CA)

(73) Assignee: Alcoa Inc., Pittsburgh, PA (US)

( * ) Notice: Subject to any disclaimer, the term of this patent is extended or adjusted under 35 U.S.C. 154(b) by 545 days.

(21) Appl. No.: 12/363,248

(22) Filed: Jan. 30, 2009

(65) Prior Publication Data
US 2010/0193369 A1    Aug. 5, 2010

(51) Int. Cl.
  *C25C 7/06* (2006.01)
  *C25C 3/06* (2006.01)
(52) U.S. Cl. ......... 204/245; 205/372; 222/594; 266/237
(58) Field of Classification Search .................. 204/245
  See application file for complete search history.

(56) References Cited

U.S. PATENT DOCUMENTS

| | | | | |
|---|---|---|---|---|
| 2,536,859 A | * | 1/1951 | Tama | 373/142 |
| 3,567,206 A | * | 3/1971 | Heggstad et al. | 266/142 |
| 3,994,481 A | * | 11/1976 | Torvund et al. | 266/239 |
| 4,551,218 A | * | 11/1985 | Gesing et al. | 204/240 |
| 4,742,994 A | * | 5/1988 | Zannini et al. | 266/165 |
| 6,079,953 A | * | 6/2000 | Morales | 417/53 |
| 6,378,743 B1 | * | 4/2002 | Kagan | 222/590 |

FOREIGN PATENT DOCUMENTS

| | | | |
|---|---|---|---|
| JP | 59177360 | * | 10/1984 |
| JP | 59177369 | * | 10/1984 |
| KR | 20070066766 | * | 6/2007 |
| WO | WO 2004/074524 A1 | * | 9/2004 |
| WO | WO 2008/052319 | | 5/2008 |
| WO | WO2008/138220 | * | 11/2008 |

OTHER PUBLICATIONS

International Search Report and Written Opinion from corresponding International Patent App. No. PCT/US2009/068514, mailed Apr. 1, 2010.*
Corrected International Search Report from the corresponding International Patent App. No. PCT/US2009/068514, mailed May 26, 2010.*

* cited by examiner

*Primary Examiner* — Harry D Wilkins, III
(74) *Attorney, Agent, or Firm* — Greenberg Traurig, LLP

(57) ABSTRACT

Systems, methods and apparatus for facilitating removal of molten metal from an electrolysis cell are provided. In one embodiment, a system includes a container and an electrical source coupled to the container. The electrical source may be configured to provide complementary current to a spout of the container. This complementary current may create a complementary electromagnetic field at least proximal a tip portion of the spout. When the spout of the container receives the complementary current, and when the spout is in liquid communication with the molten liquid of the electrolysis cell, the complementary electromagnetic field of the complementary current may at least partially assist to increase the flow of molten metal into the spout of the container.

13 Claims, 2 Drawing Sheets

ENHANCEMENT OF ALUMINUM TAPPING BY APPLICATION OF TARGETED ELECTROMAGNETIC FIELD

BACKGROUND

An electrolysis cell is a container containing an electrolyte through which an externally generated electric current is passed via a system of electrodes (e.g., an anode and cathode) in order to change the composition of a material. For example, an aluminum compound (e.g., $Al_2O_3$) may be decomposed into pure aluminum metal (Al) via an electrolysis cell. After the metal is produced, it is generally removed from the cell via a crucible and vacuum suction system.

SUMMARY OF THE DISCLOSURE

The instant disclosure relates to systems, methods and apparatus for facilitating removal of molten liquids from an electrolysis cell. In one aspect, a system is provided. The system may include a container and an electrical source coupled to the container. The electrical source may be configured to provide complementary current to a spout of the container. This complementary current may create a complementary electromagnetic field at least proximal a tip portion of the spout. When the spout of the container receives the complementary current, and when the spout is in liquid communication with the molten liquid of the electrolysis cell, the complementary electromagnetic field of the complementary current may at least partially assist to create flow and/or increase the flow of molten metal into the spout of the container.

To "increase the flow of molten metal into the spout of a container" means to cause the molten metal to flow into the spout at a greater rate than would be achieved without generating a complementary electromagnetic field, via a complementary current, proximal the tip portion of the spout. For example, a vacuum system may be utilized to remove the molten liquid from an electrolysis cell via the spout at a first removal rate. An electrical source coupled to the container may provide complementary current to the spout creating a complementary electromagnetic field proximal the tip portion of the spout and, causing the molten metal to flow into the spout at a second removal rate, the second removal rate being greater than the first removal rate.

Current is the flow of electrically charged particles in a medium between two points having a difference in electrical potential. For example, when connected to an electrical source, current may flow from the spout of the container and into the molten liquid. A current may create an electromagnetic field.

A complementary current is current provided directly and purposefully to a container (e.g., a spout of a container), and for the purpose of inducing a complementary electromagnetic field proximal the container so as to increase flow of molten metal into the container. For example, a complementary current may be provided to the spout of the container by coupling an electrical source to the container in such a way to induce a predetermined range of complementary electromagnetic field proximal a tip portion of the spout. Conversely, standard current is that current which is normally supplied to an electrolysis cell to facilitate the changing of the composition of a material (e.g., via reduction) and not with the purpose of creating a complementary current proximal a spout so as to increase flow of molten metal into the spout.

The complementary current provided to the spout is generally in the range of about 400 amps to about 2200 amps. In one embodiment, the complementary current provided to the spout is at least about 500 amps. In other embodiments, the complementary current provided to the spout is at least about 750 amps, or at least about 1000 amps, or at least about 1250 amps, or at least about 1500 amps. In one embodiment, the complementary current provided to the spout is not greater than about 2000 amps. In one embodiment, complementary current provided to the spout in the range of from 1700 to 2000 amps.

An electromagnetic field is any field having both electrical and magnetic properties and which is created by a current. For example, a complementary electromagnetic field can be created in the molten metal proximal the tip portion of the spout via a complementary current.

A complementary electromagnetic field is an electromagnetic field predominately produced via a complementary current. In one embodiment, the complementary electromagnetic field proximal the tip portion of the spout is in the range of one Gauss to three-hundred Gauss, depending on the amount of complementary current provided to the spout.

An electromagnetic force is a force that an electromagnetic field exerts on one or more electrically charged particles. For example, an electromagnetic force may be created in a molten metal via a supplied current.

An electrical source is any device capable of supplying and/or varying electrical current and/or voltage. For example, an electrical source may be configured to supply a constant or varying electrical current to a spout of a container. In one embodiment, the electrical source is an anode bus of an electrolysis cell. An anode bus is a carrier used to provide charge to electrodes of an electrolysis cell where current enters the electrolysis cell. For example, an anode bus is used to pass an electrical current into the electrolysis cell via the anodes. In another embodiment, the electrical source is a cathode bus of an electrolysis cell. A cathode bus is a carrier used to collect the charge of electrodes of an electrolysis cell where current leaves the electrolysis cell. For example, a cathode bus is used to collect the electrical current passed through the electrolysis cell via the cathodes. In another embodiment, the electrical source is an electrical source separate from that of an electrolysis cell.

In one embodiment, the container includes a body and a spout connected to the body. The body may be adapted to contain molten metal (e.g., aluminum), such as a crucible-style container. A spout is a member coupled to a container that allows the passage of liquids into or out of the container. The spout may include a base portion, a tip portion, and a passageway connecting the base portion to the tip portion. The base portion may be connected to the body of the container. The tip portion may be adapted to engage a molten liquid of an electrolysis cell. This molten liquid may pass into the body of the container via the passageway.

A molten liquid is any element or compound in liquid form at elevated temperature. This molten liquid may include at least one of molten metal and electrolyte. For example, in an aluminum electrolysis cell, aluminum metal (Al) and/or cryolite may make up at least a part of a molten liquid. Molten metal means any metal in liquid form at elevated temperature. For example, in an aluminum electrolysis cell, aluminum (Al) may make up the molten metal.

An electrolysis cell is a container containing an electrolyte through which an externally electric current is passed via a system of electrodes (e.g., an anode and a cathode) in order to change the composition of a material. For example, an aluminum compound (e.g., $Al_2O_3$) may be decomposed into pure aluminum metal (Al) via an electrolysis cell.

In one embodiment, the system includes a vacuum system configured to extract molten liquid of the electrolysis cell into the container via the spout. A vacuum system is any device configured to remove molten liquid from the electrolysis cell by removing gas molecules from a sealed volume in order to leave behind a partial vacuum. For example, a vacuum system may be used to extract molten liquid of an electrolysis cell into a spout of a container.

In one embodiment, the complementary electromagnetic field of the complementary current at least partially assists to decrease mixing of the molten metal and the electrolyte proximal the tip portion of the spout as the molten metal flows into the spout. To "decrease mixing of the molten metal and the electrolyte proximal the tip portion of the spout as the molten metal flows into the spout" means to reduce the amount of mixing of molten metal and electrolyte proximal the tip of the spout via complementary current, and by an amount that is noticeable relative to the amount of mixing that normally occur in the absence of the complementary current. For example, an electrical source coupled to the container may provide complementary current to the spout inducing a complementary electromagnetic field proximal the tip portion of the spout, and causing a decrease in the amount of electrolyte that gets mixed into the molten metal flowing into the spout of the container.

Methods of extracting molten metal from an electrolysis cell are also provided. In one aspect, a method may include the steps of flowing molten liquid of an electrolysis cell through a spout of a container, passing (e.g., concomitant to the flowing step), a complementary current through the spout of the container and into at least a portion of the molten liquid, and inducing (e.g., concomitant to at least the passing step), a predetermined range of complementary electromagnetic field proximal the tip portion of the spout via the complementary current. The inducing step may at least result in an increased flow of the molten metal into the spout of the container. The inducing step may at least decrease mixing of the molten metal and the electrolyte proximal the tip portion of the spout as the molten metal flows into the spout.

In one embodiment, the passing step includes at least one of the following steps (i) flowing the complementary current from an anode bus of the electrolysis cell to the spout of the container and into at least a portion of the molten liquid, and (ii) flowing the complementary current from a cathode bus of the electrolysis cell to the spout of the container and into at least a portion of the molten liquid.

In one embodiment, a method includes creating, in response to the flowing step, a complementary electromagnetic field at least proximal the tip portion of the spout in the range of one to three-hundred Gauss. In one embodiment, the method includes applying a vacuum to the container (e.g., via a vacuum system) so as to extract molten liquid of the electrolysis cell from the electrolysis cell and into the container via the spout.

Various ones of the above noted aspects, approaches and embodiments may be combined to yield various systems, apparatus and methods configured to enhance removal of a molten metal from an electrolysis cell via a targeted electromagnetic field. These and other aspects, advantages, and novel features of the invention are set forth in part in the description that follows and will become apparent to those skilled in the art upon examination of the following description and figures, or may be learned by practicing the invention.

DETAILED DESCRIPTION

Reference will now be made in detail to the accompanying drawings, which at least assist in illustrating various pertinent embodiments of the present invention.

Broadly the instant disclosure relates to systems, methods, and apparatus for extracting liquids (e.g., molten aluminum) from an electrolysis cell. These systems, methods, and apparatus may utilize an electrical source that provides a complementary current to a spout of a container, such that, when the spout is in liquid communication with the liquids of the electrolysis cell, a complementary electromagnetic field proximal a tip portion of the spout is created. This complementary electromagnetic field at least partially assists to increase the flow of molten metal into the spout of the container. As described above, a complementary current is current provided directly and purposefully to a container (e.g., a spout of a container), and for the purpose of inducing a complementary electromagnetic field proximal the container. A complementary electromagnetic field is an electromagnetic field predominately produced via a complementary current.

Figure 1:
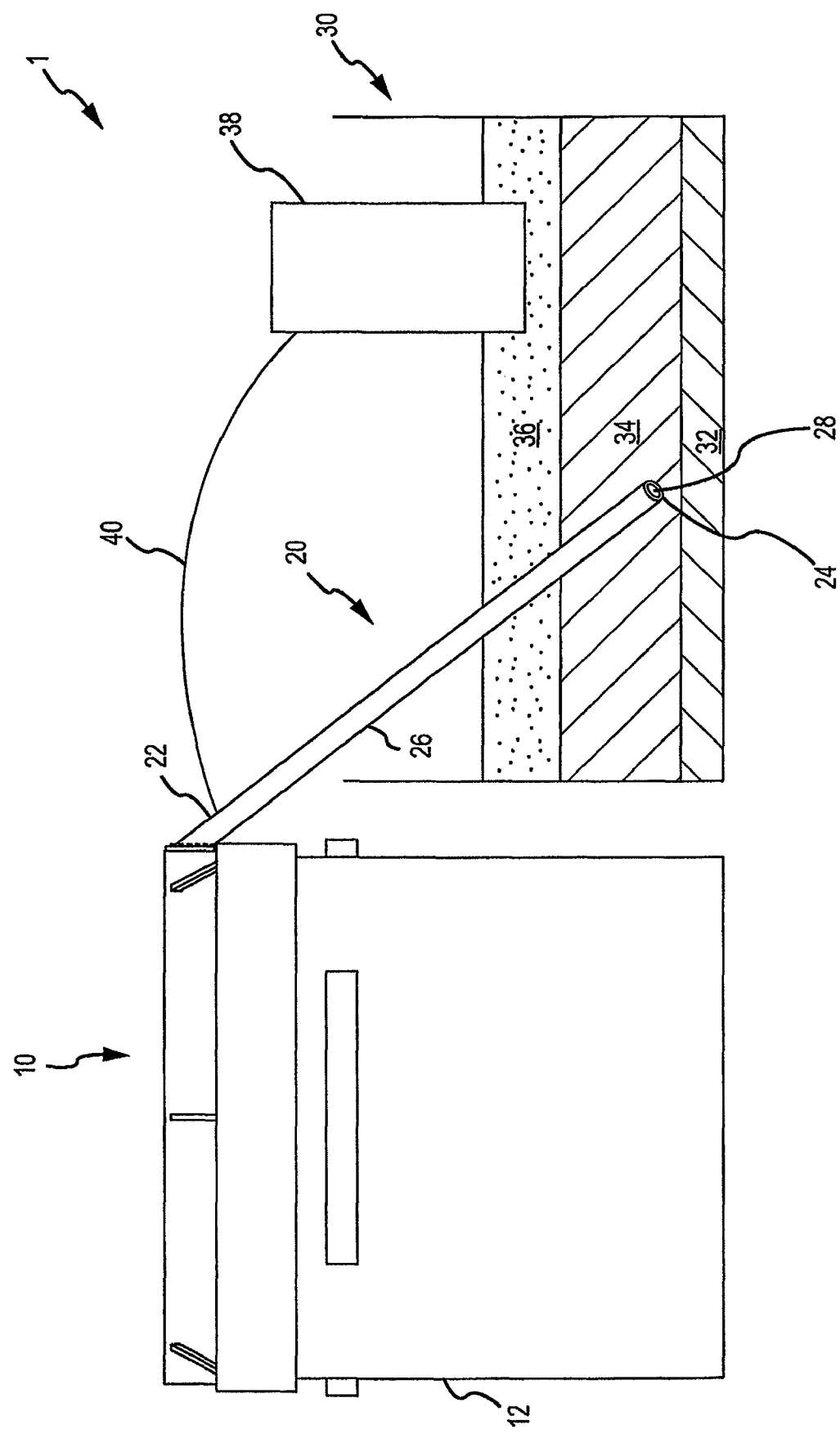
FIG. 1 is a schematic view of one embodiment of a container and an electrolysis cell useful in accordance with the present disclosure.

In one embodiment, and with reference now to FIG. 1, a system 1 includes a container 10 (e.g., a crucible) that has a body 12 adapted to contain molten metal 34 of an electrolysis cell 30. A spout 20 of the container 10 comprises a base portion 22, a tip portion 24, and a tube portion 26 connecting the base portion 22 to the tip portion 24. The base portion 22 of the spout 20 is connected to the body 12 of the container 10 and a passageway 28 is disposed within the spout 20. The passageway 28 extends at least from the tip portion 24 of the spout 20 to the base portion 22 of the spout 20 to facilitate flow of liquid into the body 12 of the container 10. In other words, the passageway 28 facilitates liquid communication between the tip 24 of the spout 20 and the body 12 of the container 10.

The tip portion 24 of the spout 20 is adapted to engage molten liquid of the electrolysis cell 30. An electrical source 38 is electrically coupled to the base portion 22 of the spout 20 via wire 40. In the illustrated embodiment, the electrical source 38 is an anode bus 38 of the electrolysis cell 30. However, in other embodiments, the electrical source 38 may be a cathode bus 32 of the electrolysis cell 30, or any other independent power source. The electrical source 38 may be configured to provide complementary current (not illustrated) to the spout 20 of the container 10 via wire 40 and into at least a portion of the molten liquid. This complementary current may create a complementary electromagnetic field at least proximal the tip portion 24 of the spout 20, which may assist in removal of molten metal 34 from the electrolysis cell 30.

For example, in some embodiments, a vacuum system (not illustrated) is coupled to the container 10 and may be utilized to facilitate the removal of molten liquid from the electrolysis cell 30 and into the container 10 via the spout 20. When the spout 20 is in liquid communication with the molten liquid of the electrolysis cell 30, the complementary electromagnetic field of the complementary current may at least partially assist in increasing the flow of molten metal 34 into the spout 20 of the container 10 by interacting with the complementary current and producing a force (e.g., an electromagnetic force) on the molten metal 34 proximal the tip portion 24 of the spout 20. Likewise, the complementary electromagnetic field of the complementary current may at least partially assist in decreasing mixing of the molten metal 34 and electrolyte 36 proximal the tip portion 24 of the spout 20 of the container 10 by interacting with the complementary electromagnetic field and producing a force on the molten metal 34 proximal the tip portion 24 of the spout 20.

Generally, the amount of complementary electromagnetic field proximal the tip portion 24 of the spout 20 needed to achieve increased flow of molten metal 34 into the spout 20 of the container 10 and/or decreased mixing of molten metal 34 and electrolyte 36, is at least about 1 Gauss and is dependent on the amount of complementary current provided to the spout 20. In one embodiment, the amount of complementary electromagnetic field is not greater than about 300 Gauss. In other embodiments, the amount of complementary electromagnetic field proximal the tip portion 24 of the spout 20 is at least about 10 Gauss. In other embodiments, the amount of complementary electromagnetic field is at least about 20 Gauss, or at least about 30 Gauss, or at least about 40 Gauss. In one embodiment, the amount of complementary electromagnetic field proximal the tip portion 24 of the spout 20 is not greater than about 250 Gauss. In other embodiments, the amount of complementary electromagnetic field is not greater than about 200 Gauss, or not greater than about 150 Gauss, or not greater than about 100 Gauss. The complementary electromagnetic field proximal the tip portion 24 of the spout 20 may be within a variety of ranges.

As described above, a vacuum system may be utilized to facilitate the removal of molten metal 34 from the electrolysis cell 30. In other embodiments, it may be possible to remove the molten metal 34 from the electrolysis cell, mostly, or even solely, based on the application of the complementary current, and in the absence of the vacuum system. For example, when the complementary current is sufficiently high (e.g., at least 1700 amps), the complementary electromagnetic field generated proximal the tip portion of the spout 24 may be high enough to cause a sufficient electromagnetic force so as to remove the molten metal 34 from the electrolysis cell 30 and into the container 10, and in the absence of the vacuum system. For example, the complementary electromagnetic field may at least partially induce a siphon effect in the spout 20, thereby resulting in removal of the molten metal 34 from the electrolysis cell 30, and in the absence of the vacuum system.

In yet other embodiments, it may be useful to decrease the amount of electrolyte 36 that mixes with the molten metal 34 proximal the tip portion 24 of the spout 20, and sometimes in the absence of the vacuum system. For example, the molten metal 34 in the electrolysis cell 30 may move in an erratic motion causing electrolyte 36 to get mixed into the molten metal 34 without a vacuum being applied to the electrolysis cell 30. Decreasing the amount of electrolyte 36 that gets mixed into the molten metal 34 proximal the tip portion 24 of the spout 20 may be achieved, as mentioned above, by the electrical source 38 providing complementary current to the spout 20 of the container 10 via wire 40 creating a complementary electromagnetic field proximal the tip portion 24 of the spout 20. This complementary electromagnetic field produces a force on the molten metal 34 proximal the tip portion 24 of the spout 20. This decreased mixing may be useful, for example, to improve the tapping process of electrolysis cells.

Figure 2:
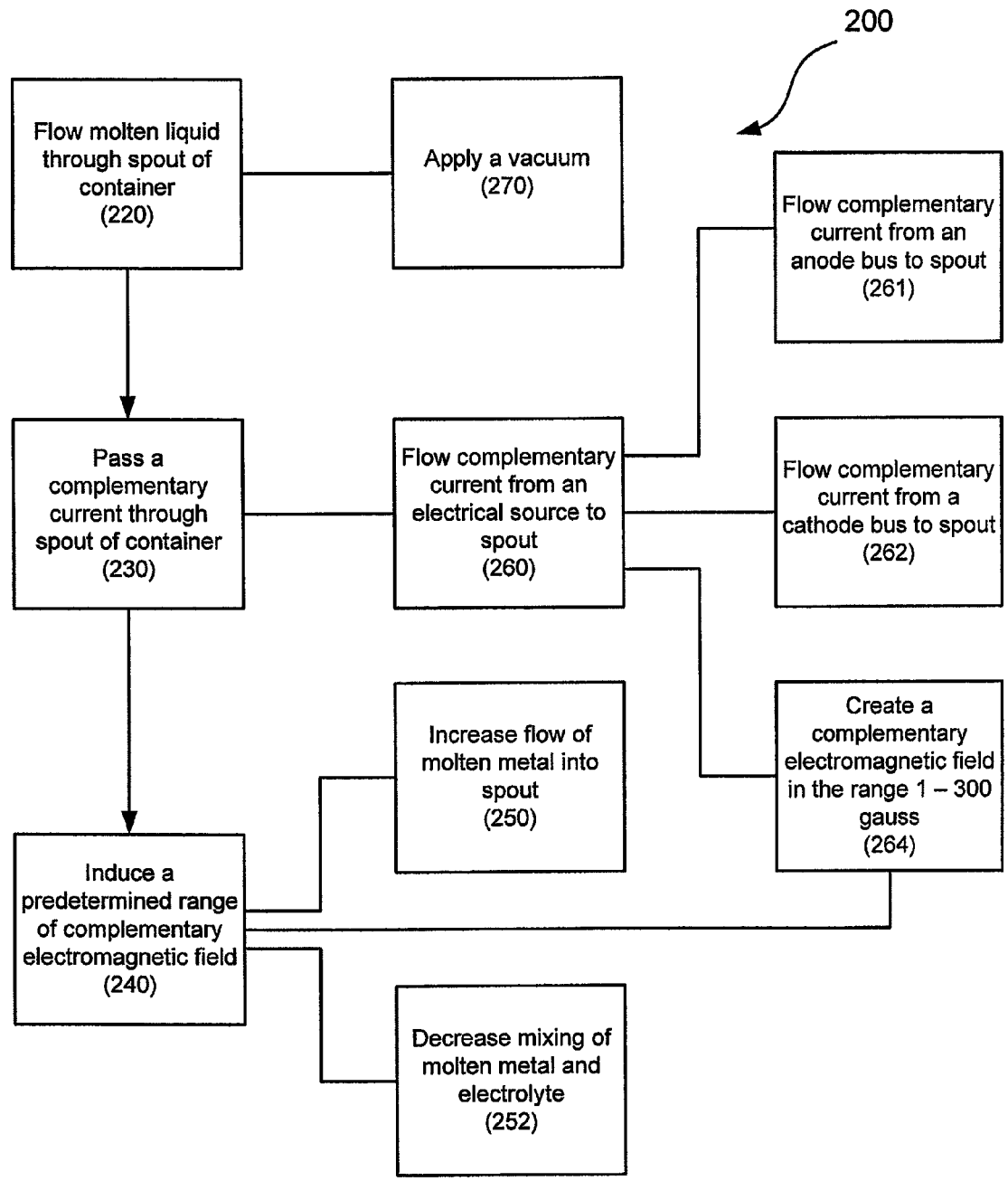
FIG. 2 is a flow chart of one embodiment of methods useful in increasing the flow of molten metal into a spout of a container.

Methods of tapping electrolysis cells are also provided, one embodiment of which is illustrated in FIG. 2. In the illustrated embodiment, the method (200) includes the steps of flowing molten liquid of an electrolysis cell through the spout of the container (220), passing a complementary current through the spout of the container and into at least a portion of the molten liquid (230), and inducing a predetermined range of complementary electromagnetic field proximal the tip portion of the spout via the complementary current (240). Each of these steps may be completed serially or in parallel, and in overlapping or non-overlapping fashion, and thus may be concomitant to one another.

As noted above, the method may include flowing molten liquid of an electrolysis cell through the spout of the container (220). The flowing step (220) may optionally include the step of applying a vacuum to extract molten liquid of the electrolysis cell into the container via the spout (270), e.g., to at least partially assist in achieving the flowing step (220), such as via a vacuum system.

With respect to the passing step (230), a complementary current may pass through the spout of the container and into at least a portion of the molten liquid. This passing step (230) may include flowing the complementary current from an electrical source of the electrolysis cell to the spout of the container and into at least a portion of the molten liquid (260). For example, the step (260) may include flowing the complementary current from an anode bus of the electrolysis cell (261) or a cathode bus of the electrolysis cell (262) to the spout of the container and into at least a portion of the molten liquid. In response to the flowing step (260), a complementary electromagnetic field at least proximal the tip portion of the spout, such as in the range of one to three-hundred Gauss, may be created (264).

With respect to the inducing step (240), in one approach, the inducing step (240) at least results in an increased flow of the molten metal into the spout of the container. This inducing step (240) may result in an increased flow of the molten metal into the spout of the container (250). The inducing step (240) may also/additionally result in decreased mixing of molten metal and electrolyte proximal the tip portion of the spout as the molten metal flows into the spout (252). The creating step (262) may a part of (in whole or part) of the inducing step (240).

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A system comprising:
   (a) a container, wherein the container comprises:
      (i) a body, wherein the body is adapted to contain molten metal; and
      (ii) a spout comprising a base portion, a tip portion, and a passageway connecting the base portion to the tip portion;
         wherein the base portion is connected to the body of the container;
         wherein the tip portion is adapted to engage a molten liquid of an electrolysis cell;
         wherein the molten liquid of the electrolysis cell may pass into the body of the container via the passageway; and
         wherein the molten liquid of the electrolysis cell comprises molten metal and electrolyte; and
   (b) an electrical source coupled to the container, wherein the electrical source is configured to provide complementary current to the spout of the container, wherein the complementary current creates a complementary electromagnetic field at least proximal the tip portion of the spout, wherein when the spout is receiving the complementary current and when the spout is in liquid communication with the molten liquid of the electrolysis cell, the complementary electromagnetic field of the complementary current at least partially assists to increase the flow of molten metal into the spout of the container.

2. The system of claim 1, further comprising:
a vacuum system configured to extract molten liquid of the electrolysis cell into the container via the spout.

3. The system of claim 2, wherein the complementary electromagnetic field of the complementary current at least partially assists to increase the flow of molten metal into the spout of the container during operation of the vacuum system.

4. The system of claim 1, wherein the complementary electromagnetic field of the complementary current at least partially assists to decrease mixing of the molten metal and the electrolyte proximal the tip portion of the spout as the molten metal flows into the spout.

5. The system of claim 1, wherein the electrical source is an anode bus of the electrolysis cell.

6. The system of claim 1, wherein the electrical source is a cathode bus of the electrolysis cell.

7. The system of claim 1, wherein the complementary electromagnetic field proximal the tip portion of the spout is in the range of one to three-hundred Gauss.

8. The system of claim 1, wherein complementary current provided to the spout is at least about 500 amps.

9. A method comprising:
(a) flowing molten liquid of an electrolysis cell through a spout of a container, wherein the container comprises a body configured to contain the molten liquid, wherein the spout is connected to the body of the container, and wherein the molten liquid comprises at least one of molten metal and electrolyte;
(b) passing, concomitant to the flowing step (a), a complementary current through the spout of the container and into at least a portion of the molten liquid;
(c) inducing, concomitant to at least the passing step (b), a predetermined range of complementary electromagnetic field proximal the tip portion of the spout via the complementary current;
 (i) wherein the inducing step at least results in an increased flow of the molten metal into the spout of the container.

10. The method of claim 9, comprising:
applying a vacuum to the container, wherein the applying comprises:
 extracting molten liquid of the electrolysis cell from the electrolysis cell and into the container via the spout.

11. The method of claim 9, wherein the inducing step (c) comprises:
decreasing mixing of the molten metal and the electrolyte proximal the tip portion of the spout as the molten metal flows into the spout.

12. The method of claim 9, wherein the passing step (b) comprises at least one of the following steps:
flowing the complementary current from an anode bus of the electrolysis cell to the spout of the container and into at least a portion of the molten liquid; and
flowing the complementary current from a cathode bus of the electrolysis cell to the spout of the container and into at least a portion of the molten liquid; wherein the complementary current is at least about 500 amps.

13. The method of claim 12, comprising:
creating, in response to the flowing step, a complementary electromagnetic field at least proximal the tip portion of the spout in the range of one to three-hundred Gauss.

* * * * *